US010361854B2

(12) United States Patent
Guilley et al.

(10) Patent No.: US 10,361,854 B2
(45) Date of Patent: Jul. 23, 2019

(54) MODULAR MULTIPLICATION DEVICE AND METHOD

(71) Applicant: SECURE-IC SAS, Cesson-Sévigné (FR)

(72) Inventors: Sylvain Guilley, Paris (FR); Cédric Murdica, Rennes (FR)

(73) Assignee: SECURE-IC SAS, Cesson-Sévigné (FR)

( * ) Notice: Subject to any disclaimer, the term of this patent is extended or adjusted under 35 U.S.C. 154(b) by 114 days.

(21) Appl. No.: 15/392,197

(22) Filed: Dec. 28, 2016

(65) Prior Publication Data

US 2017/0187529 A1 Jun. 29, 2017

(30) Foreign Application Priority Data

Dec. 29, 2015 (EP) ..................................... 15307167

(51) Int. Cl.
*H04L 9/32* (2006.01)
*G06F 7/72* (2006.01)
*H04L 9/14* (2006.01)
*H04L 9/30* (2006.01)

(52) U.S. Cl.
CPC .............. *H04L 9/302* (2013.01); *G06F 7/722* (2013.01); *G06F 7/728* (2013.01); *H04L 9/14* (2013.01); *H04L 9/304* (2013.01); *H04L 9/3033* (2013.01); *H04L 9/3249* (2013.01); *G06F 2207/7261* (2013.01)

(58) Field of Classification Search
CPC ......... H04L 9/302; H04L 9/14; H04L 9/3033; H04L 9/304; H04L 9/3249; G06F 7/722; G06F 7/728
USPC .......................................................... 380/30
See application file for complete search history.

(56) References Cited

U.S. PATENT DOCUMENTS

| 6,366,673 | B1* | 4/2002 | Hollmann | ............... G06F 7/723 380/28 |
| 2009/0235089 | A1* | 9/2009 | Ciet | ........................ G06F 21/14 713/190 |
| 2016/0350077 | A1* | 12/2016 | Peeters | .................... G06F 7/723 |

OTHER PUBLICATIONS

European Search Report for 15307167.5 dated Aug. 18, 2016.
(Continued)

*Primary Examiner* — Michael S McNally
(74) *Attorney, Agent, or Firm* — Meagher Emanuel Laks Goldberg & Liao, LLP (57) ABSTRACT

There is provided a modular multiplication device for performing a multiplication of a first multiplicand and a second multiplicand modulo a given modulus, each of the multiplicand comprising a given number of digits, each digit having a given word size. The modular multiplication device comprises:
- a multiplier for multiplying at least one digit of the first multiplicand with the second multiplicand to produce a multiplier output;
- a modular reduction unit configured to reduce a quantity derived from the multiplier output by the product of an extended modulus and an integer coefficient, the extended modulus being the product of the given modulus with an extension parameter, which provides a reduction output, the reduction output being a positive integer strictly smaller than the extended modulus, wherein the modular multiplication device further comprises a selection unit configured to select the extension parameter such that the time taken for the device to perform the multiplication is independent from the multiplicands.

19 Claims, 7 Drawing Sheets

(56) References Cited

OTHER PUBLICATIONS

Jinook Song et al., "Division-less High-Radix Interleaved Modular Multiplication Using a Scaled Modulus", SOC Design Conference (ISOCC), 2011 International, IEEE, Nov. 17, 2011 (Nov. 17, 2011), pp. 215-218.
Jean-Francois Dhem, "Design of an efficient public-key cryptographic library for RISC-based smart cards", These Soutenue en vue de L'Obtention du Grade de Docteur Ensciences Appliquees, UCL, Faculte des Science Appliquees, Louvain-La-Neuve, BE, May 1, 1998 (May 1, 1998), page complete.
Jean-Francois Dhem et al.,"Recent Results on Modular Multiplications for Smart Cards", Jan. 1, 2006 (Jan. 1, 2006), Smart Card. Research and Applications Lecture Notes in Computer Sciences;;LNCS, Springer, Berlin, DE, pp. 336-352.
Paul Kocher. "Timing attacks on implementations of Diffie-Hellman, RSA, DSS, and other systems." In: N. Koblitz (editor), Advances in Cryptology—CRYPTO'96, vol. 1109 of Lecture Notes in Computer Science, pp. 104-113. Springer-Verlag, 1996.
Arash Hariri and Arash Reyhani-Masoleh, "On Countermeasures Against Fault Attacks on Elliptic Curve Cryptography Using Fault Detection" In: Fault Analysis in Cryptography, 2012, Springer.
H. Sato, D. Schepers and T. Takagi (2005), Exact Analysis of Montgomery Multiplication, Progress in Cryptology-INDOCRYPT 2004, Lecture Notes in Computer Science, publisher: Springer Berlin, vol. 3348, p. 1387-1394.
Marc Joye and Michael Tunstall, "Fault Analysis in Cryptography", Springer LNCS, 2011, DOI: 10.1007/978-3-642-29656-7 ; ISBN 978-3-642-29655-0.

\* cited by examiner

MODULAR MULTIPLICATION DEVICE AND METHOD

BACKGROUND

The invention generally relates to data processing, and more particularly to a modular multiplication method and device.

Modular multiplication is used in a number of fields and in particular in data securing systems, such as cryptographic systems. Cryptographic systems use cryptographic schemes which lie on modular multiplications between long integer multiplicands. The performance of the overall cryptographic system closely depends on the optimization of the modular multiplication.

Cryptographic systems are widely used to ensure the privacy and authenticity of messages communicated over insecure channels, in a variety of products such as embedded devices, smartcards. Asymmetric cryptographic systems (also referred to as "public-key" cryptographic systems) use a pair of keys comprising a public key and a private key to encrypt and decrypt a message so that to ensure that the message arrives securely without being intercepted by an unauthorized user.

An asymmetric cryptographic system may be subject to different types of attacks intended to access the private key. A first type of attacks is based on searching for the private key. The computational complexity of such attack depends on the number of bits comprised in the private key. Hence, an asymmetric cryptographic system may be protected from this type of attack by selecting a private key made of a large number of bits. However, other types of attacks target cryptographic systems with keys comprised of a large number of bits. These attacks use mathematical or analytical optimization to try to reduce the search space.

There also exist indirect attacks implemented against robust cryptographic systems based on analysis of the behavior of a cryptographic device, the cryptographic device being seen as a black box containing a known algorithm and an unknown key. Such indirect attacks comprise "side-channel attacks" or SCA which use information ("side-channel information" such as the power consumption of the cryptographic device) observed during the execution of the cryptography algorithm to retrieve some secret information embedded in a cryptographic device (Paul Kocher. Timing attacks on implementations of Diffie-Hellman, RSA, DSS, and other systems. In N. Koblitz, editor, Advances in Cryptology—CRYPTO'96, volume 1109 of Lecture Notes in Computer Science, pages 104-113. Springer-Verlag, 1996).

A particular type of side-channel attack that proved to be very efficient is realized through the injection of deliberate (malicious) faults into a cryptographic device and the observation of the corresponding erroneous outputs (differential fault analysis (DFA)). Such attacks limit the number of experiments needed to obtain the bits of the secret key.

A variety of countermeasure systems and methods have emerged to protect asymmetric cryptographic systems against such indirect attacks. Indirect attacks may be directed to a number of cryptosystems such as RSA cryptosystems, public key cryptosystems, or elliptic curve cryptosystems. In particular, embedded devices based on elliptic curve cryptography such as mobile devices or smart cards, are particularly sensitive to side-channel attacks (SCA). Elliptic Curve Cryptosystems (ECC) are now considered as a powerful and popular alternative to RSA cryptosystems because they require shorter key sizes than RSA and improve the security level.

In many cases, public key encryption is implemented by arithmetic operations using a multiple-length odd integer as a modulus. The speed of this arithmetic operation influences the performance of the system. One method of modular multiplication that is particularly suitable for cryptographic systems is the Montgomery Modular Multiplication. The Montgomery Modular Multiplication (referred to hereinafter as MMM) consists in an operation which allows to compute arithmetic operations in finite fields or rings. It possesses a fast implementation, which makes it preferred over straightforward modular multiplication when many multiplications are needed, like in most cryptographic asymmetric algorithms. For instance, RSA (Rivest, Shamir, Adleman) computes a modular exponentiation over the multiplicative ring, the modular exponentiation thus forming a sequence of multiplications. The exponent is usually large, typically 2048 bits or more, hence a few thousands multiplications per RSA.

Another well known cryptographic scheme which uses the modular multiplication is the Elliptic Curves Cryptography (ECC) which consists in operations on a finite $\mathbb{F}_q$, where q is the power of a prime. For each operation on the curve (doubling and addition—since the curve is a group), a few (typically about ten) multiplications are required. Furthermore, the number of operations on the curve is a few hundreds, hence a total of a few thousands multiplications per ECC computation.

A naive implementation of the product of two elements x and y in $\mathbb{Z}_N$ consists in computing xy as if x and y were integers, and then reduce the result modulo N. One possibility is to subtract N to xy until the result is strictly smaller than N. However, this algorithm is highly inefficient. A faster alternative consists in dividing xy by N, and to keep only the remainder. But such Euclidean division is very costly (from 5 to 20 more than a product). The MMM allows a fast computation for modular multiplications which avoids divisions. It is adapted to the architecture of computers. Defining the radix R as the smallest power of $2^w$ greater than the modulus N, for example, when N fits on 2048 bits, then $R=(2^w)^{64}=2^{64w}=2^{2048}$ if w=32 bits.

The MMM requires to plunge the arguments into the so-called Montgomery representation. The MMM computes an actual modular multiplication within this representation, and does it efficiently as, the multiplication and the reduction can be interleaved, thereby keeping intermediate products of small size. With a MMM, the reduction (interleaved or not) is performed modulo a power of 2 instead of the initial module. A reduction modulo a power of 2 consists of a shift of bits, instead of performing a real division.

A MMM depends on one parameter, called the radix R. For efficiency reasons, R is generally chosen to be a large power of two. Depending on the relative value of R and the modulus N, the MMM can require an extra reduction step.

Typically, for moduli of cryptographic size, such as 1024, 2048, 4096 bits for RSA, or 192, 256, 512 for ECC, the value of the radix R is chosen to be the smallest power of two (strictly) larger than the modulus, for performances reasons.

A number in a finite ring or field is represented in machines as a sequence of digits, which are called limbs, and that correspond to the machine natural bitwidth (for instance 8, 16, 32 or 64 bits). Further, the moduli sizes are all multiples of the limb bitwidths. Accordingly, if the radix R is chosen to be twice the minimal value (R being a power of two), then all the computations must be carried out on integers which have an extra limb. This causes more numerous operations to be carried out.

With this choice of R, the MMM algorithm ends by a final test (also referred to as "extra-reduction"): it either returns the correct result or the correct result plus the modulus and hence shall be reduced. No such "extra-reduction" exists if R is not the smallest power of two greater than the modulus, but the second, third, etc. smallest power of two greater than the modulus.

However, the presence of this extra-reduction has some important drawbacks:

First, the extra-reduction incurs an average increase of the computation time (which is nonetheless negligible compared with the addition of an extra limb in the computation);

Second, and most importantly, this extra-reduction causes a data-leakage, which raises a significant security issue.

The presence or the absence of the extra-reduction does depend on the inputs of the MMM. So, in this case, the user is potentially an attacker, who aims at recovering a private key. For example, if the attacker is able to predict internal values of the algorithm by guessing some bits of the private key, then the actual value used can be determined by observing the effect on the extra-reduction. The internal value which matches consistently (over several encryptions) the presence/absence of the extra-reduction is the most likely.

The observation of the extra-reduction can be done by several means, such as by monitoring the overall duration of the computation. If there is an extra-reduction, then this overall duration is larger. Nonetheless, the overall duration only yields an approximate idea of the presence of the extra-reduction, because the overall duration is actually affected by several (potentially thousands) extra-reductions. Therefore, a direct observation of the presence of an extra-reduction is generally performed. It can require a physical access to the machine, and the usage of a magnetic probe (or a means to spy on the instant current consumption). The extra-reduction radiation or consumption profile can thus be characterized, and later recognized by "pattern matching" in a fresh trace.

Often, the implementation of asymmetric algorithms is blinded by randomizing the processed data before computation, and de-randomizing the data after computation and just before outputting the result. Such countermeasure prevents an attacker from guessing internal values and as a result the previous attack based on prediction of internal values is unpractical.

However, it has been observed that sequences of multiplications can still be guessed, although they manipulate unknown data.

For example, considering the implementation of a cryptographic algorithm where the output of one MMM feeds another MMM (which happens to be a square, i.e., an MMM where both inputs are equal) if one key bit is equal to 1, or does not feed the square otherwise. It has been analyzed that if that key bit is equal to 1, i.e. one MMM feeds another one as a square) then if the first MMM has an extra-reduction, then it is very likely that the second MMM does not have extra-reduction and vice-versa. It has been thus shown that there exists a negative correlation between the presence of an extra-reduction on the two successive MMM. Accordingly, if the two MMM do not follow (i.e., they process independent data), then the presence of the extra-reductions is decorrelated.

Therefore, the presence of an extra-reduction can allow an attacker to extract a key, even in the presence of countermeasures (data blinding, and even regular exponentiation schemes).

There is accordingly a need for improved methods and devices for protecting asymmetric cryptographic systems against attack based on the observation of extra-reduction.

SUMMARY

In order to address these and other problems, there is provided a modular multiplication device for performing a multiplication of a first multiplicand and a second multiplicand modulo a given modulus, each of the multiplicand comprising a given number of digits, each digit having a given word size. The modular multiplication device comprises:

a multiplier for multiplying at least one digit of the first multiplicand with the second multiplicand to produce a multiplier output;

a modular reduction unit configured to reduce a quantity derived from the multiplier output by the product of an extended modulus and an integer coefficient, the extended modulus being the product of the given modulus with an extension parameter, which provides a reduction output, the reduction output being a positive integer strictly smaller than the extended modulus, wherein the modular multiplication device further comprises a selection unit configured to select the extension parameter such that the time taken for the device to perform the multiplication is independent from the multiplicands.

In one embodiment, the device may be allocated a memory space for storing words, the maximal size of the memory space being defined by an integer constant, and the selection unit being configured to select the extension parameter as a function of the ratio between the integer constant and the double of the modulus.

In certain embodiments, the selection unit may be configured to select the extension parameter to be inferior to the ratio.

In one embodiment, the selection unit may be configured to select the extension parameter in an interval strictly comprised between 1 and the ratio.

The integer constant may be a power of two raised to an exponent, the exponent being equal to the product of the word size by an integer, the integer representing the number of words used to represent the modulus added to one.

In particular, the selection unit may be configured to select the extension parameter in an interval strictly comprised between one and an upper threshold defined as two raised to the word size divided by two.

The extension parameter may be the largest prime smaller than the half the power of two raised to the word size.

In certain embodiments, the multiplier may configured to iteratively multiply a set of digits of the first multiplicand comprising at least one digit with the second multiplicand, which provides an intermediate multiplier output, and the modular reduction unit iteratively reduces each intermediate multiplier output, which provides an intermediate reduction output, the modular multiplication device further comprising at least one adder for adding the intermediate reduction output.

The selection unit may be configured to update the extension parameter over the iterations.

Alternatively, the selection unit may be configured to select the same extension parameter over the iterations.

In another embodiment, the multiplier may be configured to multiply the first multiplicand by the second multiplicand, which provides a main multiplier output, and the modular reduction unit being configured to reduce the main multiplier output.

There is further provided a Montgomery multiplication engine, comprising a modular multiplication device according to any of the preceding embodiments, the modular multiplication device comprising:

a coefficient determination unit configured to determine the integer coefficient from the quantity derived from the multiplier output and the integer constant, the integer constant being superior to the modulus and being a power of two raised to the word size, which provides the integer coefficient;

a division unit configured to divide the reduction output by the integer constant.

The integer coefficient is then positive.

There is further provided a Barret multiplication engine comprising a modular multiplication device according to any of the preceding embodiment, the integer coefficient being negative.

There is also provided a Quisquater multiplication engine, comprising a modular multiplication device according to any of the preceding embodiments, the integer coefficient being negative.

In addition, the invention provides cryptosystem system for implementing a cryptographic algorithm in an electronic device, the cryptographic algorithm being based on the result of at least one modular multiplication between two multiplicands, wherein the cryptographic system comprises a modular multiplication device according to any of the preceding embodiments to perform the at least one modular multiplication.

The cryptographic algorithm may be a Rivest, Shamir, and Adleman (RSA) algorithm, the cryptographic algorithm comprising a modular exponentiation unit for computing an exponent of a message, the RSA cryptographic algorithm being based on a private key d, a public key e and system parameters p, q where p and q are primes such that the public key e is prime to (p−1) and (q−1), the cryptographic system comprising an exponentiation unit for exponentiating the message to the power e modulo a modulus equal to pq, the exponentiation unit iteratively performing the exponentiation of the message using the modular multiplication device.

The cryptographic algorithm may be an Elliptic Curve Cryptography algorithm lying on a given elliptic curve, the system comprising a scalar multiplication unit configured to receive two coordinates of a point of the elliptic curve defined in a coordinate system over a finite field and a key being an binary number to generate a result of a scalar multiplication between the binary number and the point of the elliptic curve, the scalar multiplication unit comprising the modular multiplication device.

There is further provided a method for performing a multiplication of a first multiplicand and a second multiplicand modulo a given modulus, each of said multiplicand comprising a given number of digits, each digit having a given word size, the method comprising:

multiplying at least one digit of the first multiplicand with said second multiplicand to produce a multiplier output;

reducing a quantity derived from said multiplier output by the product of an extended modulus and an integer coefficient, said extended modulus being the product of said given modulus with an extension parameter, which provides a reduction output, said reduction output being a positive integer strictly smaller than said extended modulus, the method further comprising selecting said extension parameter such that the time taken for said device to perform said multiplication is independent from said multiplicands.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

It is noted that the drawings of the invention are not necessarily to scale. The drawings are merely schematic representations. The drawings are intended to depict only typical embodiments of the invention, and therefore should not be considered as limiting the scope of the invention.

DETAILED DESCRIPTION

Embodiments of the invention provide improved modular multiplication methods and devices for determining the result of a modular multiplication of two multiplicands, each comprising a number of digits.

Embodiments of the invention further provide a cryptographic system and method using the result of such modular multiplication method and device in cryptographic operations such that the protection of the cryptographic system and method is ensured against attacks which are conventionally based on the observation of the extra-reduction. Exemplary cryptographic operations include encryption, decryption operations, signature and authentication operations. The following description of certain embodiments will be made with reference to such as encryption and/or decryption operations for illustrative purpose only.

Figure 1:
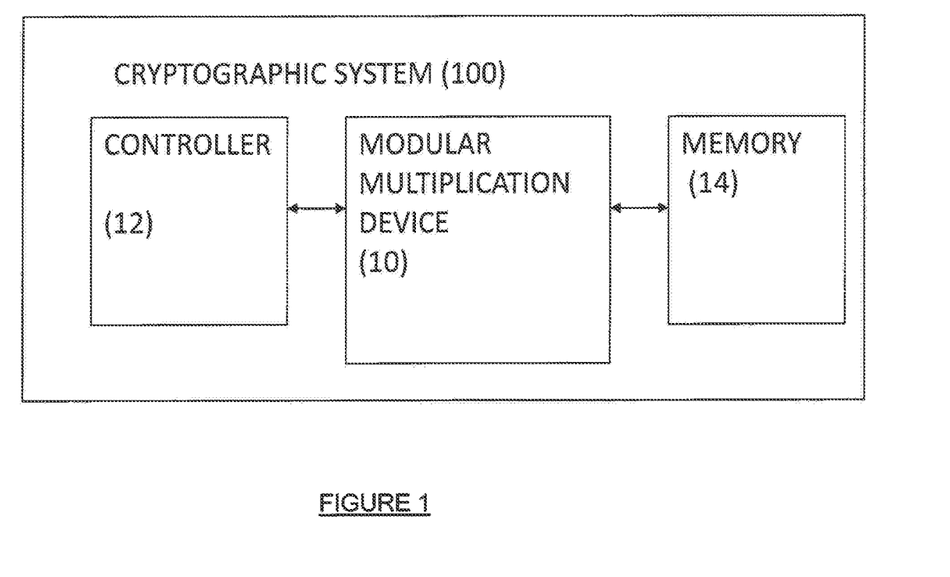
FIG. 1 represents a cryptographic system in accordance with certain embodiments of the invention.

Referring to FIG. 1, a cryptographic system 100 in accordance with certain embodiments of the invention is represented. The cryptographic system 100 comprises a modular multiplication device 10 configured to perform a modular multiplication of a first multiplicand x and a second multiplicand y modulo a given modulus N. Each multiplicand x and y comprises a given number of digits, each digit having a given word size w (for example w=8, 32 or 64 bits).

The modular multiplication device 10 may be implemented in a hardware or software module and operates on a set of parameters to produce a modular multiplication result noted $x\bar{\times}y$ from the two inputs x and y.

To initialize the modular multiplication device 10, the device may be loaded with a modulus N and a multiplication constant $R_{ext}$.

The cryptographic system 100 may include a processor for executing instructions. The processor may be a register-based processor comprising registers to store components of the value to be reduced, such as the modulus N and the multiplication constant $R_{ext}$.

A memory 14 may be used to store the results of the operations performed by the modular multiplication device 10.

Figure 2:
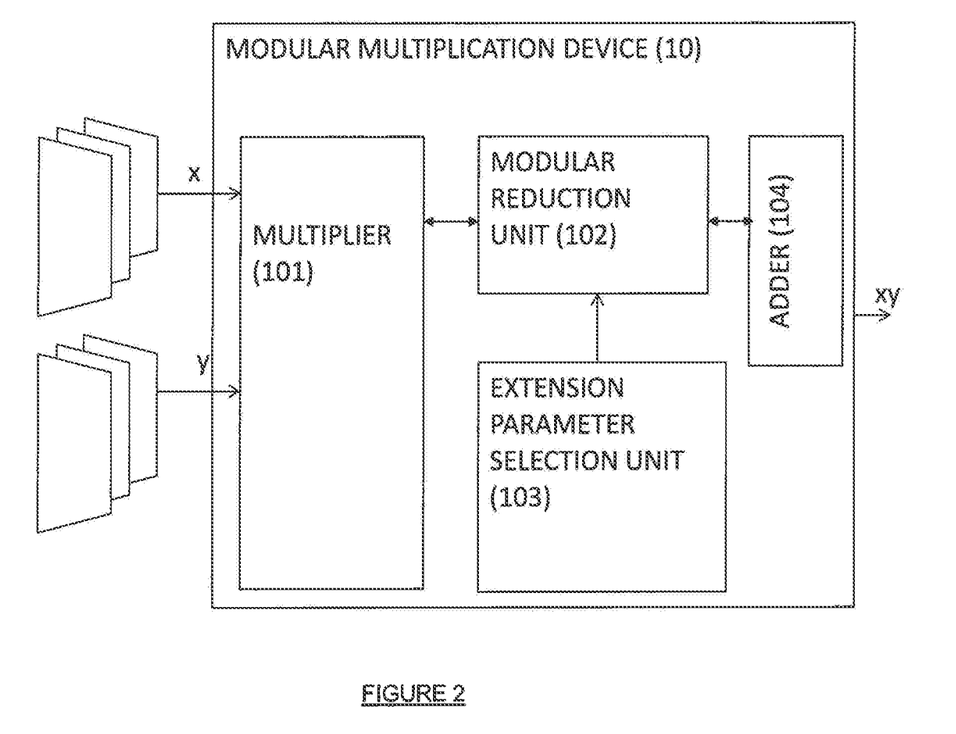
FIG. 2 is a block diagram representing the modular multiplication device according to certain embodiments.

FIG. 2 is a block diagram representing the modular multiplication device according to certain embodiments.

The modular multiplication device 10 comprises a multiplier 101 for multiplying of at least one digit of the first multiplicand with said second multiplicand to produce a multiplier output.

The modular multiplication device 10 further comprises a modular reduction unit 102 configured to reduce the multiplier output modulo a given extended modulus Nr, the extended modulus being defined as the product of said given modulus N with an extension parameter r, which provides a reduction output, the reduction output being a positive integer strictly smaller than the extended modulus Nr.

According to one aspect of the invention, the modular multiplication device 10 further comprises a selection unit 103 configure to select the extension parameter r such that the time taken for said device to perform said multiplication is independent from said multiplicands. The modular multiplication thus completes in deterministic timing and allows for non trivial computation check by reduction of the computation modulo r. Accordingly, the modular multiplication is executed in constant time without conditional reduction, thereby protecting the cryptographic system 100 from attacks which are based on such conditional reduction and ensuring fault injection resistance, while having almost no overhead in terms of computation.

The modular multiplication device 10 may be allocated a memory space for storing words in the memory 14, the maximal size of said memory space being defined by an integer constant $R_{ext}$ (also referred to hereinafter as "multiplication constant"). The multiplication constant $R_{ext}$ thus represents the maximal number of words allocated to the modular multiplication. The memory space may be used to store data used to perform the modular multiplication operation, such as inputs (multiplicands), outputs (modular multiplication result) and intermediary values used to execute the modular multiplication operation.

In certain embodiments, the selection unit 103 may be configured to select the extension parameter r as a function of a parameter $$\frac{R_{ext}}{2N}$$

defined as the ratio between said multiplication constant $R_{ext}$ and the double of said modulus2N.

In particular, the selection unit 103 may be configured to select the extension parameter r such that the extension parameter is strictly inferior to the parameter $$\frac{R_{ext}}{2N}$$

$$r < \frac{R_{ext}}{2N}$$

This allows for an operation of the modular multiplication device in deterministic time (i.e. without extra-reduction).

In one embodiment, the selection unit 103 may be configured to select the extension parameter specifically in an interval strictly comprised between 1 and the ratio $$\frac{R_{ext}}{2N}$$

In a preferred embodiment, the multiplication constant $R_{ext}$ may be superior to N and a power of two raised to an exponent equal to the product of said word size w by an integer l representing the number of words used to represent the modulus N added to one:

$$R_{ext} = 2^{w(l+1)}$$

The extension parameter r may be accordingly selected in the interval $$I = ]1, \frac{2^{w(l+1)}}{2N}[.$$

By selecting the extension parameter r in the range I, this removes the need for an extra-reduction, thereby preventing attackers from extracting the secret key, even in the presence of countermeasures.

Particularly, the selection unit 103 may be configured to select said extension parameter in an interval J strictly comprised between one and an upper threshold $$\frac{2^w}{2}$$

defined as the ratio between two raised to the word size $2^w$ and 2:

$$J = ]1, \frac{2^w}{2}[.$$

The following description of certain embodiments of the invention will be made mainly with reference to a multiplication constant $R_{ext}$ equal to $2^{w(l+1)}$ and an extension parameter selected in the interval I for illustration purpose only.

The extension parameter r may be prime to further increase the capacity of fault detection. In certain embodiments, the multiplier may be configured to iteratively multiply a set of digits of the first multiplicand x comprising at least one digit with the second multiplicand y, which provides an intermediate multiplier output, and said modular reduction unit 101 may be configured to iteratively reduce each intermediate multiplier output, which provides an intermediate reduction output. The modular multiplication device 10 may further comprise at least one adder 104 for adding the intermediate reduction outputs.

Alternatively, the multiplier 101 may multiply the first multiplicand x with the second multiplicand y, which provides a main multiplier output, the modular reduction unit 102 then reducing the main multiplier output.

The cryptographic system 100 may be for example an asymmetric cryptographic system which implements public key encryption by arithmetic operation using a multiple-length integer as a modulus N. For example, in RSA cryptographic systems, encryption and decryption are executed by power calculations in a remainder computation system using an odd composite number as a modulus. In elliptic curve encryption on a prime field $F_p$, addition of points on an elliptic curve is implemented by an appropriate combination of addition, subtraction, multiplication, and division using an odd prime number as a modulus, and encryption and decryption are executed by repetition of the point addition operation.

In one embodiment, the modular multiplication device 10 may be implemented in a Montgomery multiplication engine.

In a Montgomery multiplication engine (also referred to as the Montgomery reduction engine), calculations with respect to a modulus N are based on the use of an auxiliary number R referred to as the Montgomery radix or Montgomery base such that gcd(R, N)=1.

In certain embodiments, the modulus N may be a prime number, the radix being then preferably set to 2 to some exponent L, typically chosen as the first convenient power of 2 larger than the modulus ($R=2^L$).

The Montgomery multiplication of two numbers a and b is the Montgomery reduction of their product, written as $x \bar{x} y = xyR^{-1}$ mod N.

As R and N satisfy gcd(R, N)=1, there exist two numbers $R^{-1}$ and N' with $0 < R^{-1} < N$ and $0 < N' < R$, satisfying: $RR^{-1} - NN' = 1$.

Embodiments of the invention provide an improved Montgomery modular multiplication engine by injecting a selected value of the extension parameter r.

The cryptographic system and method according to the embodiments of the invention may be applied to perform a Montgomery Multiplication with or without final reduction, for exponentiation operations for different public key encryption techniques such as RSA or ECSM (Elliptic Curve Scalar Multiplication) based systems.

The Montgomery reduction of a number c with radix R and a prime modulus N represents the quantity given by $cR^{-1}$ mod N.

The Montgomery multiplication of two numbers a and b represents the Montgomery reduction of their product, written as $a \bar{x} b = abR^{-1}$ mod N.

As used herein, the notation x bar ($\bar{x}$) denotes the Montgomery multiplication operation.

The modular multiplication device 10 may be implemented in a Montgomery Engine to calculate the Montgomery product $x \bar{x} y$ of two multiplicands x and y.

The Montgomery engine 10 may be implemented in a hardware or software module and operates on a set of parameters to produce a result. For example, the engine may be used to produce the result $x \bar{x} y$ on two inputs x and y.

The Montgomery engine 10 may be also configured to convert to and from Montgomery form. To convert to Montgomery form, the engine receives a and $R^2$ as inputs and produces an output $\bar{a} = a \bar{x} R^2 = aR$ mod N. Conversely, for converting back to the regular form, the engine receives $\bar{a}$ and 1 as inputs and outputs $\bar{a} \bar{x} 1 = aRR^{-1} = a$ mod N.

The Montgomery engine may also be configured to calculate the Montgomery reduction of a number. In this case, the engine receives a and 1 as inputs and produces $\bar{a} = a \bar{x} 1 = aR^{-1}$ mod N as an output.

In a Montgomery engine, calculations are carried out on numbers in their Montgomery form (the Montgomery form of a number x being defined as $\bar{x} = xR$ mod N).

In some cryptographic schemes operating on numbers modulo a prime, given the modulus N, the radix R may be expressed in base 2 form, such as 2 to some positive integer exponent wl ($R=2^{wl}$), where w is the wordsize of the machine in bits and l represents the number of words needed to represent the modulus N.

Figure 3:
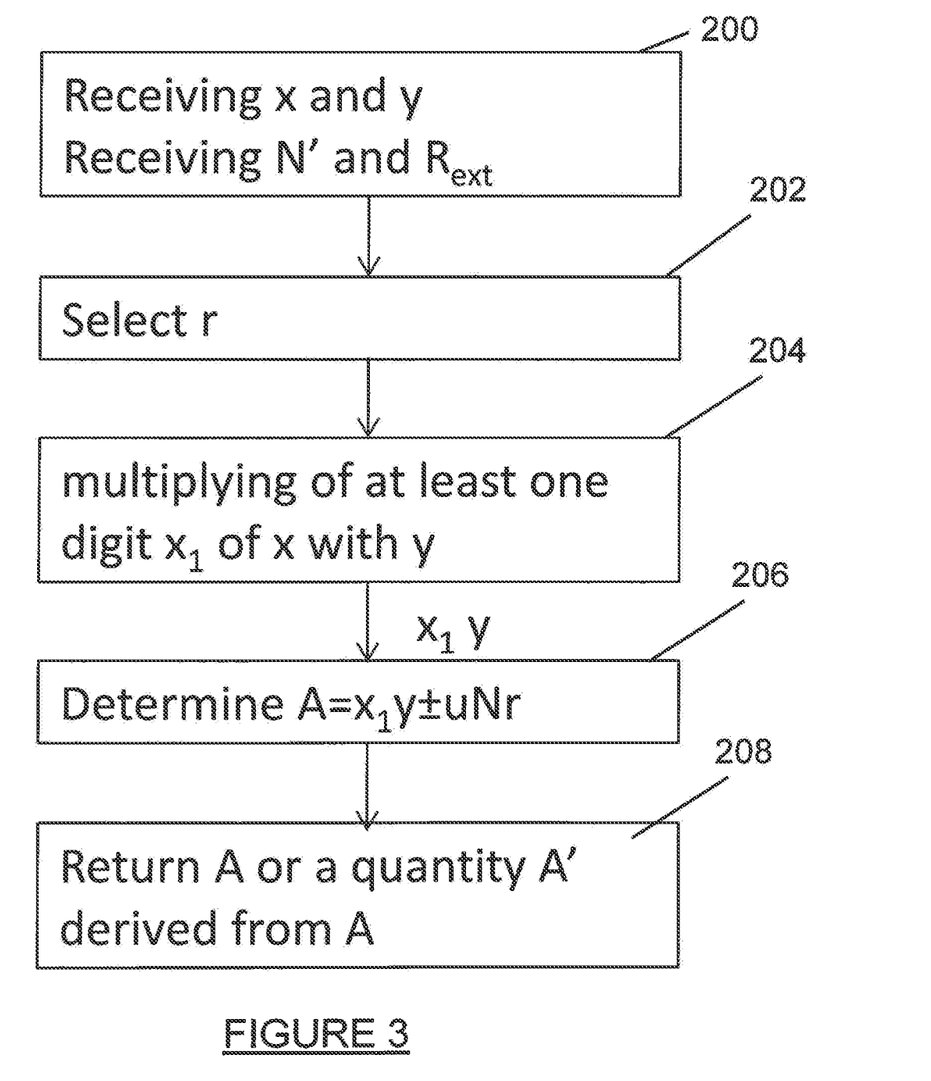
FIG. 3 is a flowchart depicting the modular multiplication method according to certain embodiments.

Referring to FIG. 3, a flowchart is presented in accordance with certain embodiments of the invention that depicts the modular multiplication method.

In step 200, the positive integer modulus integer N and the multiplication constant $R_{ext}$ are loaded and the multiplicands x and y are received.

The multiplication constant $R_{ext}$ may be defined in base two as the number 2 raised to the w(l+1) exponent, with l representing the number of words used to represent the modulus N and w designates the word size:

$$R_{ext} = 2^{w(l+1)}$$

In step 202, the extension parameter r is selected in the range $$l = ]1, \frac{2^{w(l+1)}}{2N}[.$$

In step 204, at least one digit $x_1$ of the first multiplicand is multiplied with the second multiplicand x and y.

In step 206, a quantity $A = x_1 y \pm uNr$ is determined, with u being determined such that $u \leq R_{ext}$ ($x_1 y$ is reduced modulo Nr).

Depending on the application of the invention, the method may comprise applying an operation on the reduction result A using the multiplication constant $R_{ext}$, which provides a quantity A'.

The parameter u may be determined for example by estimating the quotient of $x_1 * y$ (or $x_1 * y * R^{-1}$ in the case of a Montgomery engine) divided by Nr, such estimation being such that $q-2 \leq u \leq q$ where q represents the exact quotient.

In step 208, the quantity A or the quantity A' derived from A may be returned.

The extension parameter r obviates the need for a further reduction modulo Nr to adapt the result to the register size. In particular, selecting an extension parameter r of the type prime number in the interval $$l = ]1, \frac{2^{w(l+1)}}{2N}[$$

allows to prevent attacks based on differential power analysis and correlation power analysis. In particular, in certain embodiments, in step 202, r may be selected such that:

$$2^{wl} < Nr < \frac{2^{w(l+1)}}{2}$$

with l representing a positive integer.

Conventional approaches apply default choices of modulus extension Nr for fault detection which keeps Nr on a bitwidth multiple of w, thereby resulting in a weakness with respect to side-channel attacks as extra reductions are needed with $R=2^{w(l+1)}$ if r fits on two words. In contrast, the selection of r according to the embodiments of the invention allows detecting faults while at the same time eliminating extra reductions.

Depending on the application of the invention (for example certain exponentiation applications), the extension parameter may be specifically selected in the interval in the range $$]1, \frac{2^{w(l+1)}}{4N}[.$$

In certain embodiments, l may be chosen to be equal to the number of words used to represent the modulus N and r may be chosen in the interval $]1, 2^w/2[$. Accordingly, the computation may be extended of one word only.

The extension parameter r may be chosen randomly or according to certain criteria in the interval $]1, 2^w/2[$ to prevent attacks based on Differential Power Analysis and Correlation Power Analysis (For example, such that the Hamming distance between the different values of Nr is large).

In particular, r may be set to 2 (r=2) so that the modulus extension Nr is as smaller as possible. As a result, a large number of high most significant bits may be set to zero. The circuit can thus manipulate a number of zero-value bits, thereby reducing the power consumption.

In certain embodiments, the multiplication step 204 may be iteratively performed to multiply a set of digits of the first multiplicand x with the second multiplicand y, which provides an intermediate multiplier output, and the reduction step may be iterated to reduce each intermediate multiplier output, which provides intermediate reduction output, the modular multiplication method further comprising the intermediate reduction outputs.

The extension parameter r may be set for all iterations of steps 204 to 210 or a set of iteration or recomputed for each iteration of steps 204 to 210.

The multiplication step 204 may alternatively multiply directly the first multiplicand with said second multiplicand and apply the reduction step 206 to the multiplication result thus obtained.

Figure 4:
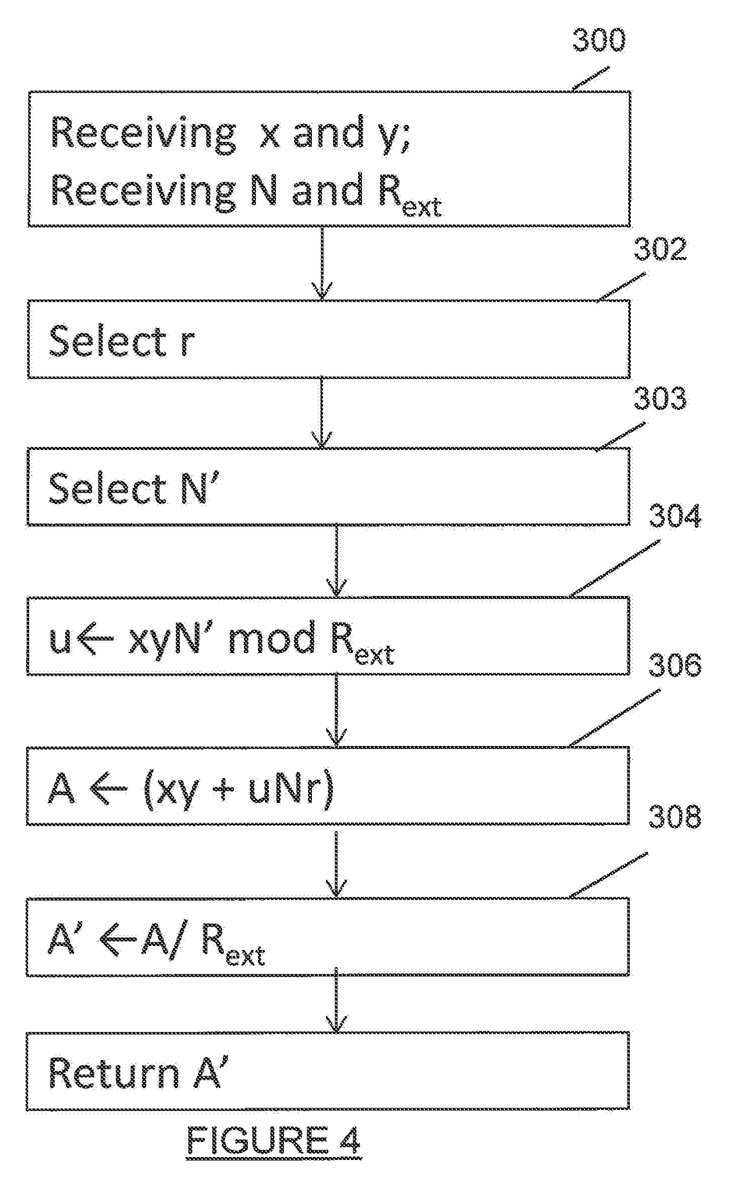
FIG. 4 is a flowchart that depicts an embodiment of the multiplication method implemented in a Montgomery engine.

FIG. 4 is a flowchart that depicts an embodiment of the multiplication method implemented in a Montgomery engine.

In step 300, the positive integer modulus integer N is received and the constant $R_{ext}$ are received.

In step 302, the extension parameter is selected radix r is selected as described in relation with step 202.

In step 303, an integer N' may be selected in [0, $R_{ext}$−1] such that:

$$NrN' \equiv -1 (\text{mod } R_{ext}),$$

In step 304, the multiplication step is performed. It comprises determining the quantity=xyN' mod Rext.

In step 306, a quantity A=(xy+uNr) is determined (A is determined by reducing xy modulo Nr).

In step 307, the quantity A is divided by Rext, which provides a quantity A' derived from $$A'\left(A' = \frac{xy + uNr}{Rext}\right).$$

In step 308, the quantity A' is returned by the Montgomery engine (for example published to the requesting application).

It should be noted that operations modulo and division by $R_{ext}$ may consist in ignoring some bits for the modular operation and shifting for the division operation. This obviates the need for explicitly storing the multiplication constant $R_{ext}$ in certain embodiments if $R_{ext}$ is a power of 2.

The Montgomery multiplication function without final reduction will be noted hereinafter $\bar{x}_{ext}$.

In certain embodiments, the modular multiplication method may be used to perform exponentiation operation.

Figure 5:
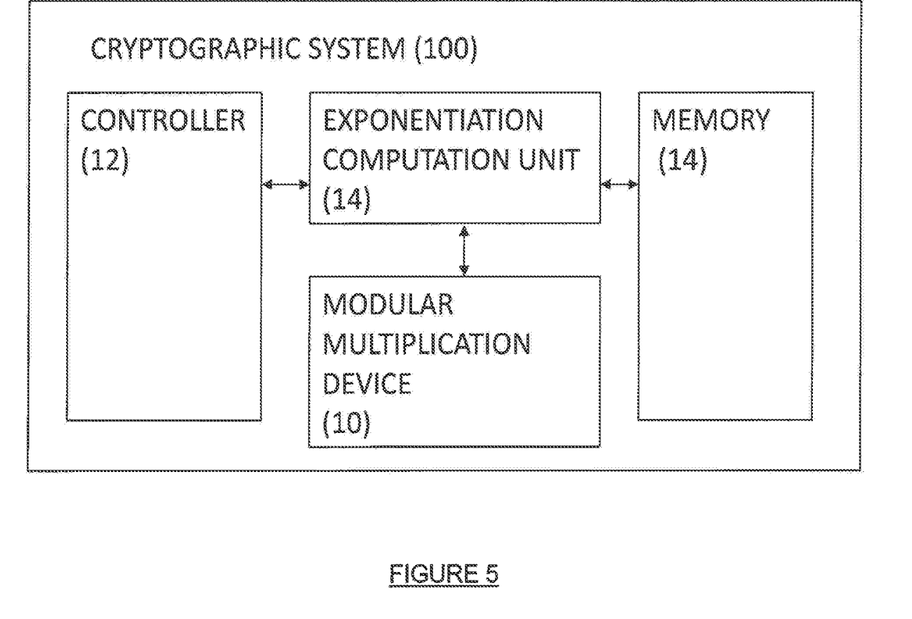
FIG. 5 depicts a cryptographic system comprising an exponentiation unit according to one application of the invention.

FIG. 5 depicts a cryptographic system 100 comprising an exponentiation unit according to an exponentiation application.

The cryptographic system 100 uses the modular multiplication device 10 to compute the modular exponentiation of an integer A (referred to as the base). The modular exponentiation of a given base A represents the remainder when the base A is raised to d-th power (referred to as the exponent) $A^d$ and is divided by the modulus N. The modular exponentiation method may be used in the public-key cryptographic systems 100 to determine many products.

In accordance with certain embodiments, the modular exponentiation may be calculated using the following function: $c \equiv A^d (\text{mod } N)$. There exist several exponentiation methods for computing n iterations of a multiplication operation (elementary multiplication operation) instead of d such as the «left-to-right binary method» or «right-to-left binary method». The modular exponentiation method may thus involve several calls to the modular multiplication method.

To compute an elementary multiplication operation, the modular exponentiation method may use the modular multiplication method implemented by the modular multiplication device 10 (for example a Montgomery engine) as it has a low computational complexity. The following description of certain embodiments of the exponentiation method will be made with reference to an application of the modular multiplication method to the Montgomery engine for illustration purpose only.

Figure 6:
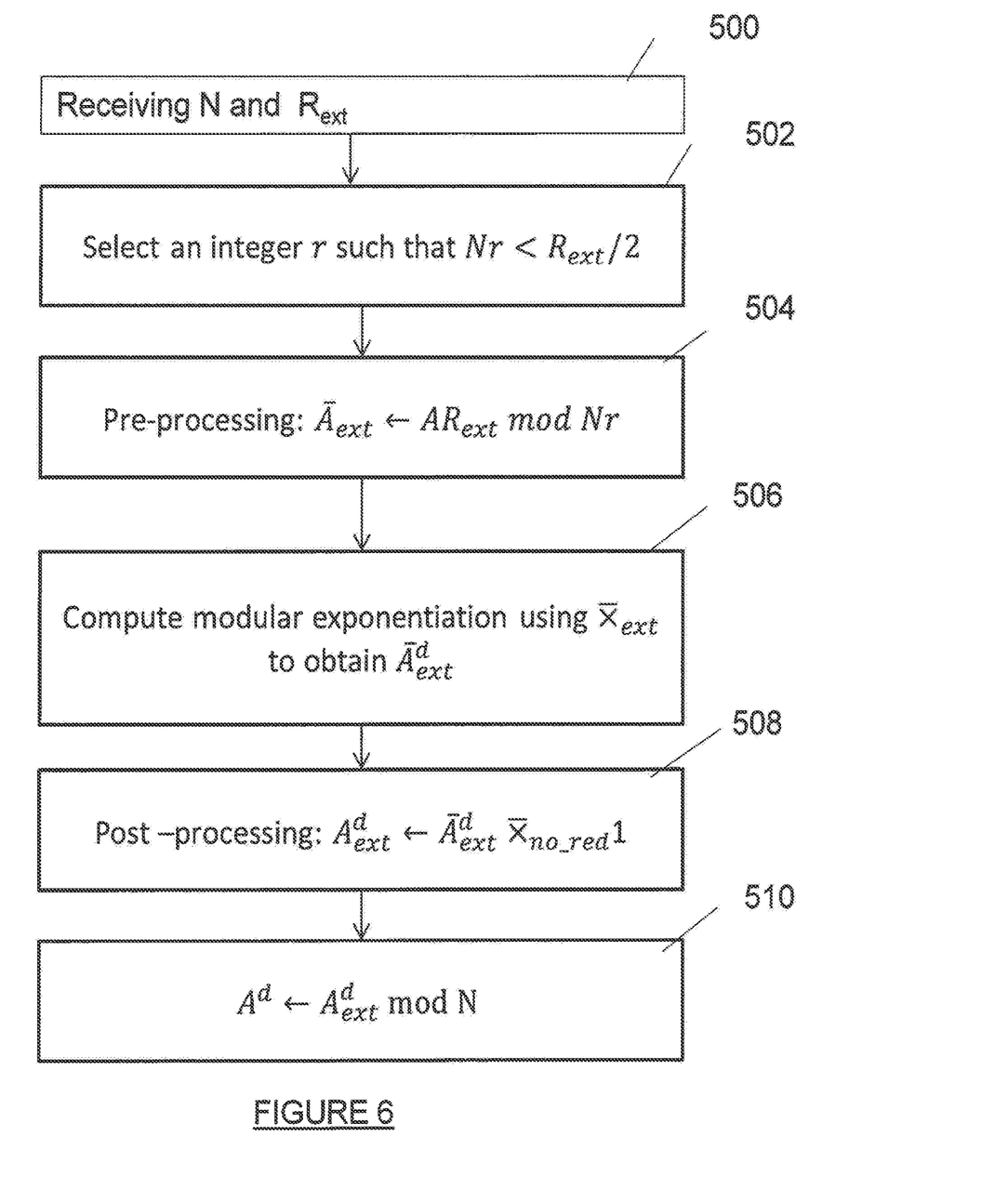
FIG. 6 is a flowchart depicting the modular exponentiation method according to certain embodiments.

FIG. 6 is a flowchart depicting the modular exponentiation method according to certain embodiments.

In step 500, the positive integer modulus integer N and the multiplication constant $R_{ext}$ are received.

In step 502, the extension parameter r may be selected according to as described in relation with step 202 of FIG. 3.

In step 504, the quantity $\bar{A}_{ext} = AR_{ext} \mod Nr$ is computed.

In step 506, the modular exponentiation is recursively computed from $\bar{A}_{ext}$ using the exponentiation function $\bar{x}_{ext}$ to determine $\bar{A}_{ext}^d$.

This includes invoking several times the modular multiplication function $\bar{x}$ to compute elementary multiplication operations. Each iteration determines $\bar{A}'_{ext} \leftarrow \bar{A}_{ext} \times \bar{B}_{ext}$ by implementing steps 204 to 208 of FIG. 2. Each subsequent multiplication invokes steps 204 to 208 of the modular multiplication function to recursively calculate the product of the current value of $\bar{A}'_{ext}$ and $\bar{A}_{ext}$.

The (d−1)-th iteration the Montgomery multiplication function thus provides $\bar{A}_{ext}$ raised to d-th power: $\bar{A}_{ext}^d$.

In step 508, a post-processing step may be performed to determine $A_{ext}^d$ from $\bar{A}_{ext}^d$ using the modular multiplication method without reduction (denoted $\bar{x}_{no-reduc}$):

$$A_{ext}^d = \bar{A}_{ext}^d \bar{x}_{no-reduc} 1.$$

In step 510, the base A raised to the d-th power is returned as:

$$A^d = A_{ext}^d \mod N$$

It should be noted that the selection step 502, may be performed once or at each iteration of modular multiplication method (in which case, step 202 is iterated and step 502 is removed).

To obviate the need for an extra reduction, $R_{ext}$ may be selected to be greater than the minimal R, i.e., $R_{ext}=2^{w(l+1)}$ and r may be chosen as a prime number such that Nr has at least one bit less than $R_{ext}$ so as to remove the need for extra reduction condition. This result in performing a modulus extension from N to Nr where r is a prime number satisfying:

$$N < Nr < \frac{2^{w(l+1)}}{2} = 2^{w(\lceil \log_2(N)/w \rceil + 1)-1)}$$

In still other embodiments, the modular multiplication function may be used to perform ECSM (Elliptic Curve Scalar Multiplication) in an Elliptic Curve cryptosystem 100.

Indeed, fault attacks may be directed not only to RSA cryptosystem but also to elliptic curve cryptosystems. Operations on elliptic curves may be used in an asymmetric cryptographic system 100.

Elliptic curves are generally defined as a set of points satisfying a certain cubic equation called the Weierstrass Equation in some field $\mathbb{K}$, i.e., as the graph of the Weierstrass Equation. Mathematically, they represent a special class of planar curves. Elliptic curves and their points can be expressed in a variety of representations such as affine coordinates, projective coordinates, Jacobian coordinates, and Montgomery form.

Elliptic curves used in cryptography are defined over a prime field $\mathbb{F}_p$ with p prime or over a binary field $\mathbb{F}_{2^t}$ for some large $t \in \mathbb{N}$. They are particularly suitable for an implementation of embedded devices that have memory constraints. Because of the physical characteristics of these devices and their use in potentially hostile environments, they are particularly sensitive to side-channel attacks (SCA) which use information observed during the execution of the algorithm to determine a secret key.

The most important operation of ECC is the scalar multiplication of an elliptic curve point P with a secret scalar factor k. This operation is often noted [k]P. Its computational cost is decisive in the overall efficiency of the ECC however implementing SCA countermeasures is very resource consuming.

Figure 7:
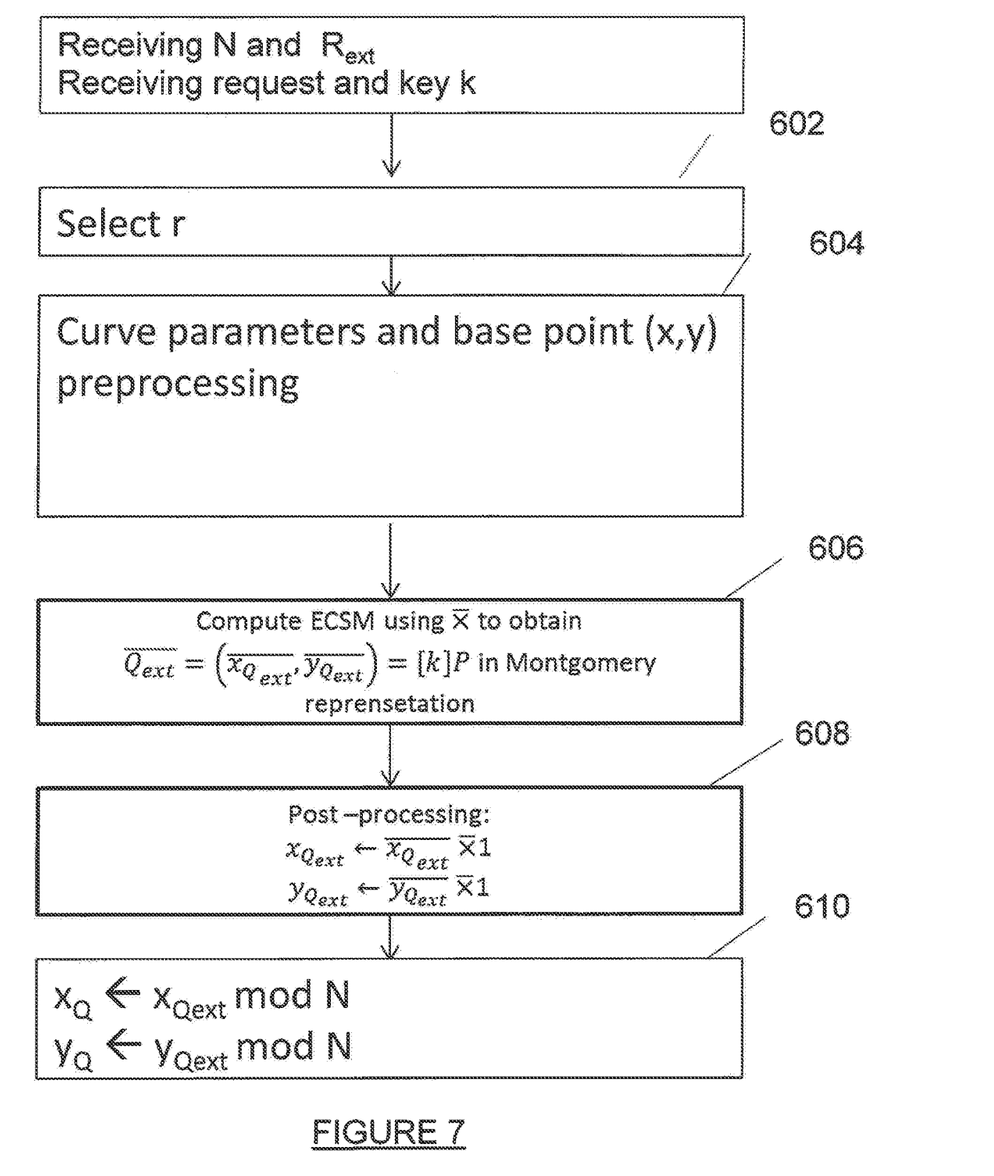
FIG. 7 is a flowchart depicting an Elliptic Curve Scalar multiplication method according to certain embodiments.

FIG. 7 is a flowchart depicting the Elliptic Curve Scalar multiplication (ECSM) method according to certain embodiments. The following description of FIG. 5 will be made with reference to a Montgomery multiplication for illustration purpose.

In step 600 a private key (scalar k) and a request for an ECSM product, e.g., a request for Q=[k]P may be received. The base point P is noted as P=(x,y) and the scalar k is noted as k=(a, b). The parameters N and $R_{ext}$ are also received or loaded.

In response to the reception of the request for the ECSM product (Q=[k]P), the extension parameter r is selected, in step 602 as described previously in relation with step 202 of FIG. 2.

In step 604, the curve parameters and the base point are preprocessed. The preprocessing comprising replacing each parameter x, y, a and b are converted into the Montgomery form:

x is thus converted into $\overline{x_{ext}} = xR_{ext}$ mod Nr;
y is thus converted into $\overline{y_{ext}} = yR_{ext}$ mod Nr;
a is thus converted into $\overline{a_{ext}} = aR_{ext}$ mod Nr;
b is thus converted into $\overline{b_{ext}} = bR_{ext}$ mod Nr.

In step 606, the ECSM Q=[k]P is computed using the Montgomery multiplication function $\overline{\times}$ instead of the regular Montgomery multiplication.

The method thus receives the base point P on an elliptic curve and a scalar k (representing the secret scalar), the base point P having a prime order, and generates a random integer.

The scalar multiplication [k]P may then be determined in the Montgomery representation as $\overline{Q}=(\overline{x_{Qext}}, \overline{y_{Qext}})$ using the Montgomery multiplication $\overline{\times}$ as:

$$\overline{Q\text{ext}}=(\overline{x}_Q,\overline{y}_Q)=[k]\overline{P}$$

The ECSM may be computed using the classic ECSM algorithms, using doubling of a point and addition of two different points.

A post-processing may be further applied to convert back the product $\overline{Q}$ from the Montgomery form into the regular form, in step 608. This comprises converting the first component $\overline{x}_Q$ into $x_Q$ and the component $\overline{y}_Q$ into $y_Q$ by applying the Montgomery multiplication operator $\overline{\times}$ as follows:

$$x_{Qext}=\overline{x_{Qext}} \overline{\times} 1$$

$$y_{Qext}=\overline{y_{Qext}} \overline{\times} 1$$

In step 609, the component $x_Q$ and $y_Q$ are determined from $x_{Qext}$ and $y_{Qext}$ according to:

$$x_Q = x_{Qext} \bmod N$$

$$y_Q = y_{Qext} \bmod N$$

From the scalar product [k]P, the product $Q=(x_Q, y_Q)$ may be published in step 310 to the requesting application.

It is an advantage of the invention to extend the "modulus" by a selected random number instead of using a conventional modulus consisting in a fixed number of machine words (i.e., its size is a multiple of the machine word length) which is prone to attacks exploiting "extra reductions". The use of an extended modulus allows a concomitant integrity check of the computation, reduces or even cancels the extra reductions (for example for RSA). In ECC computations (algorithms ECDBL & ECADD), since the reductions in additions/subtractions are absorbed during the Montgomery modular multiplication method according to the invention, such operations can be dropped or reordered.

An exemplary application of the Montgomery modular multiplication method without reduction will be described hereinafter, considering a modulus p and a value of the radius R equal to: $R=2^{\alpha+\lceil \log_2(N) \rceil}$ Such radius R is equal to $2^\alpha$ times the smaller power of two greater than N.

The radius R satisfies the following inequality:

$$2^\alpha \le R \le 2^{\alpha+1} N,$$

It should be noted that the above inequality in the lower bound would only occur if N is a power of 2. If N is a prime or a composite RSA number, this is thus never satisfied.

It has been demonstrated by the inventors that depending on the values of the parameter $\alpha>0$, the Montgomery modular multiplication may be implemented without extra-reduction and that for some values of the parameter $\alpha$. The absence of extra-reduction allows for performing instead an extra addition. In particular, it has been determined that:

for $\alpha \ge 1$, the Montgomery modular multiplication can be implemented without extra-reduction, and for $\alpha \geq 2$, a number z can be even added such that $0 \leq z \leq N-1$ without requiring an extra reduction.

Even if not limited to such applications, such embodiment of the invention has particular advantages for an elliptic cryptographic system based on mixed coordinates system, such as for example Jacobian coordinates, and which can be used in the processes of encryption, decryption, signature generation, authentication, etc.

Considering two points P1 and P2 on the Weierstrass form elliptic curve E, the sum of P1 and P2 is defined as P3=P1+P2.

Computing P1+P2 when P1 is different from P2 is referred to as an elliptic curve addition or ECADD, and computing P1+P2=[2]P1 when P1=P2 is referred to as an elliptic curve doubling or ECDBL.

The elliptic curve addition ECADD is performed to obtain the point P3=P1+P2=(x3, y3) by turning the intersection point of the straight line connecting the point P1=(x1, y1) on the elliptic curve to the point P2=(x2, y2) on the elliptic curve over the x axis.

The elliptic curve doubling is performed to obtain the point P4=[2]P1=(x4, y4) by turning the intersection point of the tangent at the point P1=(x1, y1) on the elliptic curve over the x axis.

Scalar multiplication refers to computing the point [d]P=P+P+ . . . +P (sum taken d times) for the elliptic curve over the finite field, for the point P on the curve, and for the integer (also referred to as a scalar) d. The scalar multiplication is represented by a combination of the elliptic curve addition and the elliptic curve doubling.

The computations of elliptic curve addition, elliptic curve doubling, and scalar multiplication are a combination of addition, subtraction, multiplication, squaring, and inversion in the finite field. In many cases, the computation time of multiplication by addition, subtraction, and constant is comparatively shorter than the computation time of other processes and can be ignored. The computation time of the elliptic curve addition, the elliptic curve doubling, and the scalar multiplication can be frequently thus estimated by a sum of the computation times of multiplication, squaring, and inversion in the in the finite field.

In such exemplary application, the field multiplication in the Elliptic Curve Addition noted "ECADD", is directly followed by a field square in Elliptic Curve Doubling noted "ECDBL", namely $Z_3=Z_1*Z_2*H$ in ECADD, which is followed by $Z_1^4$ in ECDBL when computing M. It should be noted that $Z_1^4$ is computed as $(Z_1^2)^2$:

according to a ECDBL, $P_3=(X_3, Y_3, Z_3)=2P_1$ can be computed as:

$X_3=T, Y_3=-8Y_1^4+M(S-T), Z_3=2Y_1Z_1, S=4X_1Y_1^2,$
$M=3X_1^2+\alpha Z_1^4, T=-2S+M^2$ according to ECADD, $P_3=(X_3, Y_3, Z_3)=P_1+P_2$ can be computed as:

$X_3=-H^3-2U_1H^2+R^2, Y_3=-S_1H^3+R(U_1H^2-X_3),$
$Z_3=Z_1Z_2H, U_1=X_1Z_2^2, U_2=x_2Z_1^2 S_1=Y_1Z_2^3,$
$S_2=Y_2Z_1^3, H=U_2-U_1, R=S_2-S_1$

There is also a field multiplication in ECDBL which is directly followed by a field square in ECDBL, namely $(2*Y_1)*Z_1=Z_3$ which is followed by $Z_1^4$ in ECDBL when computing M.

In such application of the invention, the protection consists in breaking the correlation between $X_1$ and $X_2$ doing a modulus extension according to the embodiments of the invention such that the final modulus Nr does not satisfy the assumption of being of size a multiple of machine words. Thus R is not chosen multiple of 32 or 64 bits, unlike what is done in conventional approaches (such as the article "On Countermeasures Against Fault Attacks on Elliptic Curve Cryptography Using Fault Detection" by Arash Hariri and Arash Reyhani-Masoleh, "Fault Analysis in Cryptography", 2012, Springer). This allows using all the bits of the radius R.

In the above ECBL and ECADD equations, the term $U_1H_2-X_3$ involves a multiplication $U_1H_2$ and an addition of $-X_3$, with $0 \leq -X_3 < N$, after the multiplication, assuming that $X_3$ is the coordinate of a point in affine coordinates.

The Montgomery modular multiplication method according to the embodiments of the invention removes the need for extra-reduction, the computational resources thus saved being reusable to perform additional operations such as additions.

The Montgomery modular multiplication method according to the embodiments of the invention can be written according to the following algorithm in pseudo code:

---
Input: $0 \leq x,y \leq 2^{\alpha-1}N - 1$
Output: $(xyR^{-1} \bmod N) + \lambda N$, for some $\lambda \in \mathbb{N}$
1. $c \leftarrow ab$
2. $d \leftarrow (-cN^{-1}) \bmod R$
3. $e \leftarrow c + dN$     //e mod R = 0
4. $f \leftarrow e/R$
5. Return f
---

It should be noted that a CIOS (namely Coarsely Integrated Operand Scanning) implementation of this algorithm is particularly efficient.

The following interval values for the internal variables c, d, e, f of the Montgomery modular multiplication method according to the embodiments of the invention are considered:

$0 \leq c \leq (2^{\alpha-1}N-1)^2$,
$0 \leq d \leq R-1$,
$0 \leq e \leq (2^{\alpha-1}N-1)^2+N(R-1$, $$0 \leq f \leq \frac{1}{R}\left((2^{\alpha-1}N-1)^2 + N(R-1)\right),$$

To remove the need for extra-reduction, the result f of the modular multiplication may be compatible with the condition $\mathcal{C}$ on the inputs of the Montgomery modular algorithm so that f also satisfies:

$0 \leq f \leq 2^{\alpha-1}N-1$

As f also satisfies:

$$0 \leq f \leq \frac{1}{R}\left((2^{\alpha-1}N-1)^2 + N(R-1)\right)$$

To verify condition $\mathcal{C}$, it is sufficient that:

$(2^{\alpha-1}N-1)^2+N(R-1) \leq R(2^{\alpha-1}N-1) \Leftrightarrow (2^{\alpha-1}N-1)^2-N-R(2^{\alpha-1}N-1-N) \leq 0$ Indeed, R satisfies the inequality $R \geq 2^{\alpha-1}N$ which is equivalent to:

$-R(2^{\alpha-1}N-1-N) \leq -2^{\alpha}N(2^{\alpha-1}N-1-N)$

Hence condition $\mathcal{C}$ can be satisfied if:

$(2^{\alpha-1}N-1)^2-N-R(2^{\alpha-1}N-1-N) \leq (2^{\alpha-1}N-1)^2-N-2^{\alpha}N$
$(2^{\alpha-1}N-1-N)$ The right hand side quantity of the previous equation can be rewritten as follows:

$$(2^{\alpha-1}N-1)^2 - N - 2^{\alpha}N(2^{\alpha-1}N-1-N) = 2^{2\alpha-2}N^2 +$$
$$1 - 2^{\alpha}N - N -$$
$$2^{2\alpha-1}N^2 +$$
$$2^{\alpha}N + 2^{\alpha}N^2$$
$$= 1 - (2^{2\alpha-2} + 2^{\alpha})N - N$$

The right hand side quantity of the previous equation is negative because N>1. Condition $\mathcal{C}$ is accordingly satisfied.

By adding one further addition f+z after the last step of the Montgomery modular multiplication algorithm N such that a number z is added to f with 0≤z≤N−1, the condition $\mathcal{C}$ can be rewritten as follows:

$$(2^{\alpha-1}N-1)^2-N-(R-1)+R(N-1) \le R \times (2^{\alpha-1}N-1)$$

This equation can be rewritten as:

$$(2^{\alpha-1}N-1)^2+N-2^{\alpha}N(2^{\alpha-1}N-1-N+1) \le 0 \Leftrightarrow 1+(-2^{2\alpha-2}+2^{\alpha+1})N^2-2^{\alpha}N-N \le 0$$

Such condition is verified if:

$$C_1: -2^{2\alpha-2}+2^{\alpha+1} \le 0$$

$$C_2: \alpha > 3$$

It should be noted that:
for $\alpha=3$, $-2^{2\alpha-2}+2^{\alpha+1}=0$ and
for $\alpha>3$, the quantity $-2^{2\alpha-2}+2^{\alpha+1}$ is strictly negative.

Accordingly, if the conditions $\mathcal{C}_1$ and $\mathcal{C}_2$ are verified, one further addition in affine coordinates can be tolerated without extra-reduction, such as the addition, for example to compute the term $U_1H_2-X_3$ involving the addition of $-X_3$ according to FIG. 1.

The protection method makes it possible to move the implementation outside of the attack exposure by selectively "resizing" the modulus so that the effect of extra reductions is not leaking information about the sequence of operations.

Further, a re-blinding step may be further applied during the exponentiation, whereas such blinding is conventionally done at the input of the exponentiation only.

The invention also provides a protection method used to protect the cryptographic system 100 against different types of attacks such as an attack on regular exponentiation on finite fields when the system 100 uses a Montgomery modular multiplication method according to the certain embodiments of the invention. Such attack is based on the fact that it can be determined whether the result of a multiplication (or a square) feeds (or not) a square. For example, considering an attack which is able to trace the data in a sequence of arithmetic operations, it has been noted that, especially with a very high correlation (between about 15% to 30%, in absolute values), it can be determined if the result from a multiplication is fed into a squaring operation as described in H. Sato, D. Schepers and T. Takagi (2005), "Exact Analysis of Montgomery Multiplication", Progress in Cryptology-INDOCRYPT 2004, Lecture Notes in Computer Science, publisher:Springer Berlin, volume 3348, page 1387-1394.

The various embodiments of the invention allows in one computation to get the correct answer by reducing the result modulo the nominal p, and to get a checksum by reducting the result modulo the other factor r.

The various embodiments also allow to get aligned on the memory words.

The invention offers protection against several attacks including:
timing attacks as the modular multiplication is executed in constant time without conditional reduction which is conventionally the basis of several attacks);
fault injection attacks thanks to a redundancy which allows checking the computations.

It should be noted that the invention may be implemented in any cryptosystem (e.g. RSA, ECC). In addition, a complementary verification method may be used for fault detection in certain applications.

In particular, the invention may be applied to protect asymmetrical cryptosystems against fault injection attacks, as discussed in "Fault Analysis in Cryptography" (Marc Joye and Michael Tunstall, Springer LNCS, 2011, DOI: 10.1007/978-3-642-29656-7; ISBN 978-3-642-29655-0). For example, it prevents the attacker from using one fault to break the cryptosystem (such as attacker using the BellCoRe attack against RSA when optimized with the Chinese Remainder Theorem). This also offers a protection against other faults attacks which use one fault to reveal one bit of the secret, such as safe errors on ECC.

The invention may have a significant impact on removal of covert channels (data leakage) and resistance to fault injection for use in a cryptographic system implemented in an embedded system (such as smartcards) but also for use in a cryptographic scheme implemented in a M2M platform or terminal in IoT architecture (Internet of Things).

Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept. In particular, although the invention has particular advantages for a Montgomery multiplication engine, it should be noted that the invention also applies to other modular multiplication engine such as the Barret multiplication engine or the Quisquater multiplication engine which conventionally feature extra-reductions when implemented in a straightforward manner. Barrett and Quisquater modular multiplication engines are other efficient modular multiplications for which the reduction cost is reduced by an operation in a special representation. It should be noted that according to an application of the invention to a Barrett modular multiplication engine, the modular multiplication method may comprise one or more subtractions according to step 206 ($A=x_1y-uNr$). According to an application of the invention to a Quisquater modular multiplication engine, the modular multiplication method comprise only one subtraction according to step 206 ($A=x_1y-uNr$).

Embodiments of the present invention can take the form of an embodiment containing both hardware and software elements.

Furthermore, the cryptography methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

The invention claimed is:

1. A modular multiplication device for performing a multiplication of a first multiplicand and a second multiplicand modulo a given modulus, each of said multiplicands comprising a given number of digits, each digit having a given word size, said modular multiplication device comprising:
   a multiplier for multiplying at least one digit of the first multiplicand with said second multiplicand to produce a multiplier output;
   a modular reduction unit configured to reduce a quantity derived from said multiplier output by the product of an extended modulus and an integer coefficient, said extended modulus being the product of said given modulus with an extension parameter, which provides a reduction output, said reduction output being a positive integer strictly smaller than said extended modulus,
   wherein said modular multiplication device further comprises a selection unit configured to select said extension parameter such that the time taken for said device to perform said multiplication is independent from said multiplicands.

2. The modular multiplication device of claim 1, wherein said selection unit is configured to select said extension parameter as a function of the ratio between an integer constant and the double of said modulus.

3. The modular multiplication device of claim 2, wherein said selection unit is configured to select said extension parameter to be inferior to said ratio.

4. The modular multiplication device of claim 2, wherein said selection unit is configured to select said extension parameter in an interval strictly comprised between 1 and said ratio.

5. The modular multiplication device of claim 2, wherein said integer constant is a power of two raised to an exponent, said exponent being equal to the product of said word size by an integer, said integer constant representing the number of words used to represent the modulus added to one.

6. The modular multiplication device of claim 4, wherein the selection unit is configured to select said extension parameter in an interval strictly comprised between one and an upper threshold defined as two raised to the word size divided by two.

7. The modular multiplication device of claim 1, wherein said extension parameter is the largest prime smaller than the half the power of two raised to said word size.

8. The modular multiplication device of claim 1, wherein said multiplier is configured to iteratively multiply a set of digits of said first multiplicand comprising at least one digit with said second multiplicand, which provides an intermediate multiplier output, and said modular reduction unit iteratively reduces each intermediate multiplier output, which provides an intermediate reduction output, said modular multiplication device further comprising at least one adder for adding said intermediate reduction output.

9. The modular multiplication device of claim 8, wherein said selection unit is configured to update said extension parameter over said iterations.

10. The modular multiplication device of claim 8, wherein said selection unit is configured to select the same extension parameter over said iterations.

11. The modular multiplication device of claim 1, wherein said multiplier is configured to multiply said first multiplicand by said second multiplicand, which provides a main multiplier output, and said modular reduction unit being configured to reduce said main multiplier output.

12. A Montgomery multiplication engine, wherein said Montgomery multiplication engine comprises a modular multiplication device according to claim 1, the modular multiplication device comprising:
   a coefficient determination unit configured to determine said integer coefficient from said quantity derived from said multiplier output and said integer constant, said integer constant being superior to the modulus and being a power of two raised to the word size, which provides said integer coefficient;
   a division unit configured to divide said reduction output by the integer constant.

13. The Montgomery multiplication engine of claim 12, wherein said integer coefficient is positive.

14. A Barret multiplication engine, wherein said Barret multiplication engine comprises a modular multiplication device according to claim 1, said integer coefficient being negative.

15. A Quisquater multiplication engine, wherein said Quisquater comprises a modular multiplication device according to claim 1, said integer coefficient being negative.

16. A cryptosystem system for implementing a cryptographic algorithm in an electronic device, said cryptographic algorithm being based on the result of at least one modular multiplication between two multiplicands, wherein said cryptographic system comprises a modular multiplication device according to claim 1 to perform said at least one modular multiplication.

17. The cryptosystem system of claim 16, wherein the cryptographic algorithm is a Rivest, Shamir, and Adleman (RSA) algorithm, and wherein the cryptographic algorithm comprises a modular exponentiation unit for computing an exponent of a message, the RSA cryptographic algorithm being based on a private key d, a public key e and system parameters p, q where p and q are primes such that the public key e is prime to (p−1) and (q−1), the cryptographic system comprising an exponentiation unit for exponentiating the message to the power e modulo a modulus equal to pq, wherein said exponentiation unit iteratively perform said exponentiation of the message using said modular multiplication device.

18. A cryptosystem system according to claim 16, wherein the cryptographic algorithm is an Elliptic Curve Cryptography algorithm lying on a given elliptic curve, and said system comprises a scalar multiplication unit configured to receive two coordinates of a point of said elliptic curve defined in a coordinate system over a finite field and a key being an binary number to generate a result of a scalar multiplication between said binary number and said point of the elliptic curve, wherein said scalar multiplication unit comprises said modular multiplication device.

19. A method for performing a multiplication of a first multiplicand and a second multiplicand modulo a given modulus, each of said multiplicands comprising a given number of digits, each digit having a given word size, said method comprising:
   multiplying at least one digit of the first multiplicand with said second multiplicand to produce a multiplier output;
   reducing a quantity derived from said multiplier output by the product of an extended modulus and an integer coefficient, said extended modulus being the product of said given modulus with an extension parameter, which provides a reduction output, said reduction output being a positive integer strictly smaller than said extended modulus, wherein said method further comprises selecting said extension parameter such that the time taken for said device to perform said multiplication is independent from said multiplicands.

\* \* \* \* \*